United States Patent Office 3,352,925
Patented Nov. 14, 1967

3,352,925
PRODUCTION OF MONO- AND DI-
SUBSTITUTED PHOSPHINES
Lyle A. Hamilton, Pitman, N.J., assignor to Mobil Oil
Corporation, a corporation of New York
No Drawing. Filed Apr. 28, 1964, Ser. No. 363,291
11 Claims. (Cl. 260—606.5)

ABSTRACT OF THE DISCLOSURE

Phosphine is reacted with an alcohol in the presence of a dehydrated crystalline aluminosilicate catalyst to produce corresponding mono- and di-substituted phosphines in preference to tri-substituted phosphines.

---

The present invention relates to the production of substituted phosphines. More specifically, the present invention is concerned with the catalytic size-selective production of substituted phosphines.

In the reaction of alcohols and ether compounds with phosphine to form substituted phosphines, mono-, di- and tri-substituted products are ordinarily formed simultaneously according to the following reactions:

(1) $\quad ROR' + PH_3 \longrightarrow R-P-H_2 + R'OH$, (2) $\quad 2 ROR' + PH_3 \longrightarrow R-\overset{R}{P}-H + 2 R'OH$ and (3) $\quad 3 ROR' + PH_3 \longrightarrow R-\overset{R}{P}-R + 3 R'OH$ In the above equations, R' is either hydrogen or an organic radical and R is an organic radical. R and R' may also comprise the same or different organic moieties and preferably are hydrocarbon radicals.

The synthesis employing ethers proceeds in substantially the same manner as the alcohol synthesis with the exception that the radical R' is subsequently converted to a by-product alcohol. This by-product alcohol can be used in further synthesis of phosphines by the present process utilizing substituted phosphines and alcohol reactants. Thus, two moles of phosphine may be produced from each mole of ether.

In many instances, the mono- and di-substituted phosphine products are preferred to the tri-substituted products. For this reason, it is desirable to control the reaction to favor the formation of the mono- and di-substituted derivatives in preference to the tri-substituted phosphines.

Perhaps due to the high cost of preparation, the phosphines have not been widely used on a commercial basis. It is highly desirable, therefore, that an efficient and economical method be developed for their production which will permit their use to a greater extent for organic synthesis.

Accordingly, an object of the present invention is to provide a method for producing mono- and di-substituted phosphines in preference to tri-substituted phosphines.

Another object of the present invention is to provide a method for producing substituted phosphines by the reaction of phosphine with ether or alcohol compounds to produce mono- and di-substituted phosphines and to inhibit the production of tri-substituted phosphines.

In general, the present invention comprises producing mono-substituted phosphines and di-substituted phosphines by the reaction of phosphine with alcohol or ether compounds in the presence of crystalline metal aluminosilicate catalyst having pores of a diameter that pass the mono-substituted and di-substituted products but which will not be large enough to pass the tri-substituted phosphine products.

The pore size of the crystalline metal aluminosilicate catalyst is critical and must be specially selected in view of the reactants and the particular reaction products which are formed. Thus, for example, in the production of normal aliphatic phosphines, crystalline metal aluminosilicate catalysts having a pore diameter of about 5 angstroms afford selective alkylation to mono- and di-alkyl or di-aliphatic phosphines. In the production of carbocyclic or arylphosphines, crystalline metal aluminosilicate catalysts having pore diameters of about 10 angstroms selectively yield mono- and di-carbocyclic or di-aryl phosphines in preference to tri-carbocyclic or tri-arylphosphines.

Therefore, where the compound reacted with the phosphine is an alcohol of the general formula ROH, R may be any hydrocarbon radical of a diameter small enough to pass through the pore openings of the crystalline metal aluminosilicates which is used as the catalyst.

If the compound reacted with phosphine is an ether of the general formula ROR', R and R' may be the same or different and may comprise any hydrocarbon radical small enough to pass through the pore of the crystalline metal aluminosilicate which is used as the catalyst.

Phosphine reacts with ethers and alcohols of the general formula ROR' over a wide range of reaction conditions in the presence of a crystalline metal aluminosilicate catalyst. Thus, the specific conditions are not critical and may be selected by experimentation to obtain maximum yield for particular reactants. In general, temperatures of around 200° C.–300° C. are suitable. Atmospheric pressure may be employed.

In the reactant compounds ROR', the organic radicals represented by R and in some cases by R', where the compound is an ether rather than an alcohol, may be straight or branched chain aliphatic radicals containing up to about 18 carbon atoms in the chain or may be alicyclic groups, such as cyclohexyl and methyl cyclohexyl, aromatic groups, such as phenyl and naphthyl, an aralkyl group, such as a benzyl radical, and various combinations and mixtures of the above.

The catalysts of the present invention are dehydrated crystalline metal aluminosilicates. Synthetic or natural crystalline metal aluminosilicates ordinarily are hydrated and are notable for the fact that the water of hydration may be removed without collapse of the crystalline structure. On dehydration, a highly porous product is formed which contains large numbers of interconnecting pores or passageways. Owing to the retention of its ordered crystalline structure, the pores are of a substantially constant diameter for a given species of crystalline metal aluminosilicate.

Crystalline metal aluminosilicates of the type useful in the present invention have the following general formula:

$$M_{2/n}O \cdot Al_2O_3 \cdot YSiO_2 \cdot ZH_2O$$

in the salt form, where $n$ is the valence of the metal cation M, Y is the number of moles of silica and $ZH_2O$ is the water of hydration.

Suitable crystalline metal aluminosilicates for use in the production of the catalysts of the present invention include both natural and synthetic crystalline metal aluminosilicates or zeolites.

A fairly wide variety of natural crystalline zeolites exist, and, among these, faujasite has been found to be an especially useful material for the preparation of the catalysts of this invention. Other satisfactory natural crystalline zeolites include, for example, analcite, paulingite, ptilolite, clinoptilolite, ferrierite, chabazite, gmelinite, levynite, erionite, and mordenite.

Among the most suitable synthetic crystalline aluminosilicates are the synthetic faujasites, including both X and Y types which have a crystal structure corresponding to that of natural faujasite. The preparation of such X aluminosilicates is described in U.S. Patent 2,882,244 to Milton, issued Apr. 14, 1959. The preparation of the Y type is described in Belgian Patent 577,642.

Another important synthetic crystalline zeolite not having a corresponding natural form is Zeolite A. The preparation of this crystalline aluminosilicate is described in U.S. Patent 2,882,243 to Milton and 2,982,612 to Barrer et al.

Other suitable synthetic crystalline zeolites useful in the present invention include, for example, Y zeolite, B zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, Z zeolite and others.

In addition to the designation of different crystalline forms of the aluminosilicates by letter prefixes, such as X, Y, A, etc. numerical prefixes are also employed to indicate the pore size of the particular material. For example, 4A describes a crystalline aluminosilicate having an A type crystalline structure and a pore diameter of about 4 angstroms, 10X is an X type crystalline aluminosilicate having a pore diameter of about 10 angstroms, and so forth.

It is characteristic of the crystalline aluminosilicates that the metal cation may be readily replaced by other metal cations or by hydrogen ions by ion-exchange treatment. For purposes of definition, however, hydrogen exchanged crystalline aluminosilicates will also be referred to as crystalline metal aluminosilicates. Such treatment also influences the pore size of the material being treated and thereby controls the size of molecules that can be adsorbed. For example, the exchange of the originial sodium ions of a 4A type crystalline metal aluminosilicate with potassium ions reduces the size of the molecules that it can adsorb.

Cations which may be used to replace the original metal cations of crystalline aluminosilicates may include, for example, H, Ba, Ca, Ce, Li, Mg, K, Ag, Sr, Zn and others of Groups I, II and III of the Periodic Table.

The extent of the ion-exchange treatment may also be controlled so that only a portion of the original metal cations are replaced, yielding a product containing both original and substituted cations. Likewise, more than one replacement cation may be employed in the ion-exchange treatment. For example, a solution of a mixture of rare earth chlorides is satisfactory for use in such an ion-exchange treatment.

The crystalline metal aluminosilicates of the present invention may be employed alone or in combination with various binder or matrix materials. The physical form of the catalyst may also be adapted to use in any conventional catalytic system. For example, the catalyst may be prepared in the form of finely divided particles for use in a slurry or in fluidized bed systems, or the catalyst may be in the form of beads, pellets, or the like for use in fixed or moving bed catalysis.

Suitable binder or matrix materials with which the crystalline metal aluminosilicate may be mixed or composited include various organic and inorganic materials, such as resins, clays, gels and the like. The proportion of the catalyst composition which is the crystalline metal aluminosilicate may be varied widely and the composite or mixture may also be provided in the physical forms best suited to use in the various catalytic systems.

A preferred catalyst comprises small particles of a crystalline metal aluminosilicate distributed in a matrix of a gel, such as conventional amorphous silica-alumina gel (10% alumina).

According to the present invention, it is essential that the catalyst be selected with respect to the nature of the reactant and product molecules, so that the pore size adsorbs only the mono- and disubstituted phosphines, and does not adsorb the tri-substituted product. The particular crystalline metal aluminosilicate catalysts suitable for the conduct of a specific phosphine forming reaction must therefore be determined experimentally. However, some guide lines can be established for selecting the proper catalyst. In general, if the substituent groups are normal aliphatic radicals, a catalyst of relatively small pore size will be appropriate. If the substituent radicals are relatively large, such as aryl or saturated cyclic groups, then the size-selective catalyst ordinarily will be one having a relatively large pore diameter.

The following illustrative examples will assist in reaching a better understanding of the present invention.

EXAMPLE 1

Cyclohexanol and phosphine in a mole ratio of 2:1 are added to a reactor charged with hydrogen faujasites as a catalyst at a liquid hourly space velocity of 2.0 and a temperature of 300° C. The effluent product from the reactor comprises unreacted cyclohexanol and phosphine and a mixture of mono-cyclohexyl phosphine and dicyclohexyl phosphine.

The term "liquid hourly space velocity," as used in the examples, is defined at $ft.^3 \cdot hr.^{-1}$ of reactants measured at 60° F. divided by $ft^3$ of reactor volume occupied by the catalyst.

EXAMPLE 2

Normal butanol and phosphine in a mole ratio of 2:1 are added to a reactor charged with 5A molecular sieve as a catalyst at a liquid hourly spaced velocity of 0.25 and a temperature of 200° C. The effluent product from the reactor comprises equal parts of di-n-butylphosphine and mono-n-butylphosphine. Further analysis reveals that 60% of the n-butanol is converted.

The above examples illustrate not only the synthesis of phosphines utilizing a crystalline metal aluminosilicate catalyst but also the shape selectivity of the reaction whereby the production of relatively bulkier tri-substituted phosphines can be eliminated by utilizing a catalyst with pore openings that are not large enough to pass tri-substituted phosphines.

Having disclosed the invention in some detail and with reference to specific examples and certain preferred embodiments, it will be obvious to those skilled in the art that various modifications or changes may be made in the methods described without departing from the spirit or scope of the invention as expressed in the following claims.

What is claimed is:

1. A method for producing mono- and di-substituted phosphines in preference to tri-substituted phosphines by the reaction of phosphine with an alcohol comprising contacting phosphine with said alcohol under reaction conditions in the presence of a dehydrated crystalline metal aluminosilicate having pores of a diameter large enough to pass mono- and di-substituted phosphines, but too small to pass tri-substituted phosphines.

2. The method for producing mono- and di-substituted phosphines in preference to tri-substituted phosphines comprising reacting phosphine with an alcohol having up to about 18 carbon atoms under reaction conditions and in the presence of a dehydrated crystalline metal aluminosilicate, where the alcohol and the mono- and di-substituted phosphines are all of a size which will pass through the pores of said crystalline metal aluminosilicate and said tri-substituted phosphine is too large to pass through said pores.

3. The method of claim 1 wherein the catalyst is hydrogen substituted Y faujasite.

4. The method of claim 1 wherein the alcohol is n-butanol.

5. A method for producing mono-aliphatic phosphines and di-aliphatic phosphines comprising contacting an aliphatic alcohol with phosphine under reaction conditions in the presence of a dehydrated crystalline metal aluminosilicate catalyst the pores of which have a diameter which is large enough to pass said mono-aliphatic and di-aliphatic phosphines, but is too small to pass tri-aliphatic phosphines.

6. A method for producing mono-butylphosphine and di-butylphosphine comprising contacting n-butanol with phosphine under reaction conditions in the presence of a dehydrated crystalline metal aluminosilicate catalyst having pores of a diameter large enough to pass mono-butyl and di-butylphosphine but too small to pass tri-butylphosphine.

7. The method of claim 6 wherein the catalyst is 5A molecular sieve.

8. The method of claim 6 wherein the catalyst is hydrogen substituted mordenite.

9. The method of claim 6 wherein n-butanol and phosphine are contacted in a mole ratio of 2:1 at a liquid hourly space velocity of approximately 0.25 and at a temperature of about 200° C.

10. The method for the production of mono- and di-carbocyclic phosphines comprising contacting a carbocyclic hydroxy compound with phosphine under reaction conditions in the presence of a dehydrated crystalline metal aluminosilicate catalyst having pores large enough to pass mono-, and di-carbocyclic phosphines but too small to pass tri-phosphines.

11. The process of claim 10 wherein the carbocyclic hydroxy compound is cyclohexanol and is contacted with phosphine in a mole ratio of 2:1 at a liquid hourly space velocity of about 2.0 and at a temperature of about 300° C.

References Cited
UNITED STATES PATENTS 2,825,458   3/1958   Snyder _____ 260—606.5 X TOBIAS E. LEVOW, *Primary Examiner.*

W. F. W. BELLAMY, *Assistant Examiner.*